US008802957B2

(12) United States Patent
Barker et al.

(10) Patent No.: US 8,802,957 B2
(45) Date of Patent: Aug. 12, 2014

(54) MOBILE REPLACEMENT-DIALOGUE RECORDING SYSTEM

(75) Inventors: Sean C Barker, Ladera Ranch, CA (US); Gary A Randall, Woodland Hills, CA (US); Timothy Scott Bogart, West Hollywood, CA (US)

(73) Assignee: Boardwalk Technology Group, LLC, Beverly Hills, CA (US)

( * ) Notice: Subject to any disclaimer, the term of this patent is extended or adjusted under 35 U.S.C. 154(b) by 502 days.

(21) Appl. No.: 12/875,991

(22) Filed: Sep. 3, 2010

(65) Prior Publication Data
US 2012/0041759 A1 Feb. 16, 2012

Related U.S. Application Data

(60) Provisional application No. 61/374,208, filed on Aug. 16, 2010.

(51) Int. Cl.
*G10H 3/00* (2006.01)
(52) U.S. Cl.
USPC ............ 84/723; 84/622; 84/724; 84/735; 715/723; 715/724; 717/105; 717/113; 463/31; 463/43; 704/278
(58) Field of Classification Search
USPC ......... 704/201, 270, 275, 270.1, 278; 463/31, 463/43, 40, 42; 84/622, 723, 724, 735; 725/81, 78; 381/56, 61; 715/723, 724, 715/725, 726; 717/105, 113
See application file for complete search history.

(56) References Cited

U.S. PATENT DOCUMENTS

| | | | | |
|---|---|---|---|---|
| 4,067,049 | A | * | 1/1978 | Kelly et al. ................ 386/285 |
| 4,453,809 | A | * | 6/1984 | Hill et al. ..................... 352/11 |
| 4,591,928 | A | * | 5/1986 | Bloom et al. ................ 360/13 |
| 5,467,288 | A | * | 11/1995 | Fasciano et al. ............ 715/716 |
| 6,782,365 | B1 | * | 8/2004 | Case ............................. 704/278 |
| 7,137,892 | B2 | * | 11/2006 | Sitrick ........................... 463/31 |
| 7,194,676 | B2 | * | 3/2007 | Fayan et al. ................ 715/203 |
| 7,822,813 | B2 | * | 10/2010 | Ludwig et al. .............. 709/204 |
| 7,825,231 | B2 | * | 11/2010 | Wolfe et al. ............. 435/320.1 |
| 7,867,086 | B2 | * | 1/2011 | Sitrick ........................... 463/31 |
| 7,974,493 | B2 | * | 7/2011 | Senftner et al. ............ 382/282 |

(Continued)

OTHER PUBLICATIONS

Bloom et al. "A Digital Singal Processing System for Automatic Dialogue Post-Synchronization" 1987.*

(Continued)

*Primary Examiner* — Vijay B Chawan
(74) *Attorney, Agent, or Firm* — Knobbe Martens Olson & Bear, LLP

(57) ABSTRACT

A mobile replacement-dialogue recording system enables the creation of replacement-dialogue items by mobile users not at a media recording studio. Studio-users prepare guide media video, audio and text data which are made available to mobile users through a media server. A mobile user's mobile replacement-dialogue recording device obtains guide media and allows the user to view the guide media in rehearsal mode. The mobile replacement-dialogue recording device then records the mobile user's dialogue performance while presenting the mobile user with synchronized guide media. The mobile user can review, delete, and rerecord the resulting potential replacement dialogue, as well as create feedback media characterizing the replacement dialogue. Selected replacement dialogue items can be transmitted to the media server. A studio-module can then obtain the selected replacement dialogue items and feedback media from the media server so that they may be used in media-replacement.

20 Claims, 12 Drawing Sheets

(56) References Cited

U.S. PATENT DOCUMENTS

| | | |
|---|---|---|
| 7,989,689 B2 * | 8/2011 | Sitrick et al. .................... 84/723 |
| 8,009,966 B2 * | 8/2011 | Bloom et al. ................. 386/285 |
| 8,036,767 B2 * | 10/2011 | Soulodre ........................ 700/94 |
| 2002/0010759 A1 * | 1/2002 | Hitson et al. ................. 709/219 |
| 2005/0042591 A1 * | 2/2005 | Bloom et al. ............. 434/307 A |
| 2006/0165240 A1 * | 7/2006 | Bloom et al. .................. 381/56 |
| 2007/0220575 A1 | 9/2007 | Cooper et al. |
| 2008/0019576 A1 | 1/2008 | Senftner et al. |
| 2008/0069366 A1 * | 3/2008 | Soulodre ........................ 381/63 |
| 2008/0092047 A1 * | 4/2008 | Fealkoff et al. ............... 715/716 |
| 2008/0134037 A1 * | 6/2008 | Fujimoto et al. .............. 715/716 |
| 2009/0254931 A1 * | 10/2009 | Pizzurro et al. ................... 725/5 |
| 2010/0031149 A1 | 2/2010 | Gentile et al. |
| 2010/0050221 A1 | 2/2010 | McCutchen et al. |
| 2010/0107258 A1 | 4/2010 | Park et al. |
| 2011/0113335 A1 * | 5/2011 | Rouse et al. .................. 715/723 |

OTHER PUBLICATIONS

International Search Report for Application No. PCT/US2010/048530 mailed Nov. 15, 2010.

* cited by examiner

FIG. 8

| Line #: | Upload | | | | | | | | | | | | | Done | oad Settings |
|---|---|---|---|---|---|---|---|---|---|---|---|---|---|---|---|
| Dialog | ADR User-10sTest2997-1 | | | | | | | | | | | | | | |
| | ADR User-10sTest2997-2 | | | | | | | | | | | | | | to Reyno... |
| | ADR User-10sTest2997-3 | | | | | | | | | | | | | | o, daddy. |
| | ADR User-10sTest2997-4 | | | | | | | | | | | | | | ook wond... |
| | ADR User-271-1 | | | | | | | | | | | | | | t of ADR... |
| | ADR User-271-2 | | | | | | | | | | | | | | |
| | ADR User-271-3 | | | | | | | | | | | | | | |
| | ADR User-271-4 | | | | | | | | | | | | | | ment |
| | ADR User-271-5 | | | | | | | | | | | | | | |
| | ADR User-271-6 | | | | | | | | | | | | | | |
| | ADR User-303-1 | | | | | | | | | | | | | | |
| | ADR User-303-2 | | | | | | | | | | | | | | |
| | ADR User-303-3 | | | | | | | | | | | | | | |
| | ADR User-303-4 | | | | | | | | | | | | | | |

51

MOBILE REPLACEMENT-DIALOGUE RECORDING SYSTEM

CROSS-REFERENCE TO RELATED APPLICATION

This application claims the benefit of the filing date and priority to U.S. Provisional Application No. 61/374,208, filed on Aug. 16, 2010, titled "Mobile Replacement-Dialogue Recording System."

BACKGROUND

Many film and video industries, companies, and individuals produce movies, television shows, commercial advertisements, music videos, internet videos, documentaries, and other similar content. In a common example, an initial version of a movie or television episode is created by recording actors on a set or on location using film or video cameras and microphones. In other situations, such as animated productions, voice actors are recorded in sound studios or sound booths and the resulting audio tracks are matched against video elements.

A problem commonly encountered during the production of a finalized video product is that some portion or portions of the recorded audio containing an actor's dialogue must be replaced. For example, after filming has been completed, it may be discovered that some recorded audio contains unacceptably high levels of background noise and that obtaining replacement audio is the best solution. Alternatively, a director may later decide that the emotional delivery of certain script lines needs to be changed. Similarly, new dialogue may need to be added.

These requirements can occur long after a project's scheduled recording has concluded, at which time the recorded actor may have departed for other projects. Currently, in such situations, it must be arranged for the actor to travel to a suitably-equipped sound recording facility so that the new audio can be recorded in a sufficiently controlled environment. This process is sometimes referred to as Automatic Dialogue Replacement ("ADR"), looping, a looping session, post-synchronization, or post-sync. It can entail significant costs, delays, and inconveniences. The present invention addresses these and other problems.

BRIEF DESCRIPTION OF THE DRAWINGS

The accompanying drawings, which are incorporated in and form a part of this specification, illustrate example embodiments of the invention, and in no way limit the invention. The accompanying drawings include examples of possible graphical user interfaces for use with the invention. Other implementations of the invention are contemplated using alternate hardware and/or software platforms, which may present significantly different interfaces that nonetheless represent embodiments of the invention. The accompanying drawings illustrate embodiments wherein:

FIG. 8 is an image of mobile replacement-dialogue recording software displaying selected replacement items for upload.

DETAILED DESCRIPTION OF SPECIFIC EMBODIMENTS

Figure 1:
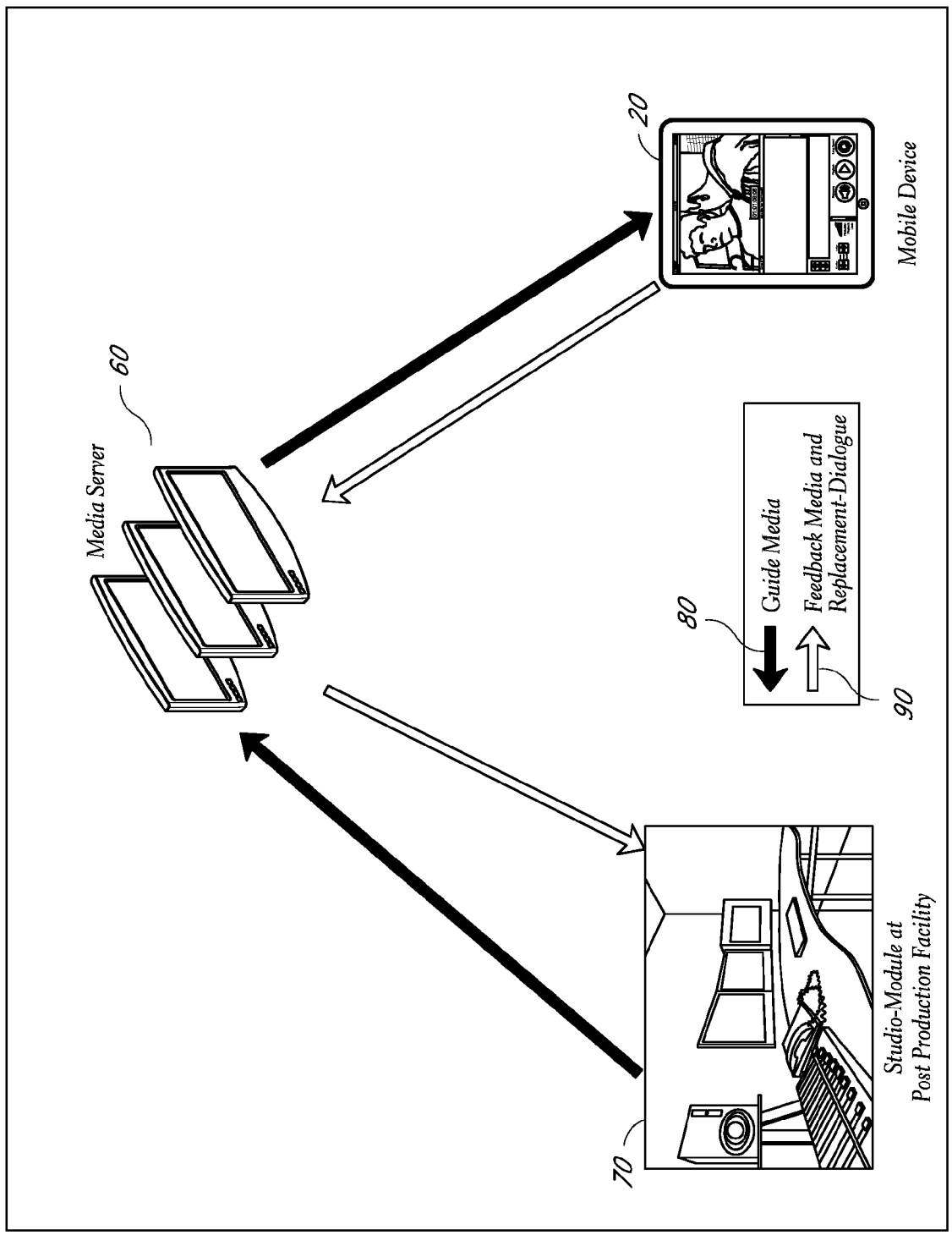
FIG. 1 is a high-level system architecture for a mobile replacement-dialogue recording system, illustrating the primary components of one embodiment of the present invention.

A mobile replacement-dialogue recording system is described. The system includes a mobile replacement-dialogue recording device 20 designed for use by a mobile user. The mobile replacement-dialogue recording device 20 includes hardware and software components which allow it to obtain and output guide media 80 and 30, record potential replacement-dialogue items 32, output the potential replacement-dialogue items for review 33, receive input corresponding to the review of potential replacement-dialogue items, generate feedback media, designate potential replacement-dialogue items as selected replacement-dialogue items 34, and transmit the selected replacement-dialogue items and feedback media 35 and 36. The mobile replacement-dialogue recording device 20 provides its mobile user, often an actor, with settings in connection with these functions. Some components may be connected to and located external to the mobile replacement-dialogue recording device. FIG. 1 provides an example of the replacement-dialogue recording system, with a mobile replacement-dialogue recording device 20 shown in the lower-right corner and labeled as "Mobile Device"

The replacement-dialogue mobile device is useful in situations where replacement dialogue is needed but traditional methods for creating such replacement dialogue are inconvenient. A movie's filming may be complete, but during the post-production process it becomes apparent that some dialogue portion of the film's audio track needs to be replaced. The initial track may contain unacceptable background noise, equipment may have malfunctioned, or some difference in the actor's dialogue performance may be sought. The actor who was recorded on the film's set may now be far away and have a busy schedule booked for months in advance. Traditionally, that actor would need to go to travel to a recording studio in order to record replacement dialogue. Instead, the mobile replacement-dialogue recording device 20 enables the actor, as a mobile user, to record new audio tracks for his dialogue which are saved as replacement-dialogue items. Because the mobile replacement-dialogue device can embodied in a sufficiently small size, it can be conveniently mailed to the actor, who can have it mailed back The mobile replacement-dialogue device can be pre-loaded with guide media for the actor to use, and the actor's replacement-dialogue items can be obtained from the device upon its return. For example, the device can obtain guide media items in a pre-loaded fashion by data transfer over a USB cable, which it can also use to transmit replacement-dialogue items. Alternatively, the device can obtain guide media items from a media server 60, and transmit replacement-dialogue items back to the server using a wireless protocol. The device therefore allows the post-production facility to quickly and conveniently get a replacement-dialogue item which can be used in substitution for the original track.

The mobile replacement-dialogue recording system also includes a media server 60—shown in FIG. 1 at the center-top and labeled as "Media Server" 60. The media server 60 stores media items, such as guide media 80, replacement-dialogue 90, and feedback media 90. Examples of such media items include digital files containing video, audio, text, or other data formats. Many of these media items include the dialogue to be replaced, or the dialogue that it is being replaced with in various formats—such as video and audio recordings, and text script lines.

A studio-module 70 may also be included in the mobile replacement-dialogue recording system. The studio-module 70 is designed for use by a studio user. FIG. 1 includes a studio-module 70 in the lower-left corner and labeled as "Studio-Module at Post Production Facility." The studio-module 70 produces guide media 80 and uploads 72 guide media to the media server 60. After a mobile replacement-dialogue recording device 20 has uploaded a selected replacement-dialogue item to the media server 60, the studio-module 70 downloads it 30. The studio-module 70 may also download other selected replacement-dialogue items, which may correspond to the same guide media item, or different guide media items. The studio-module 70 may also download feedback media uploaded 36 to the media server 60 by the mobile replacement-dialogue recording device 20. Such feedback data may assist a studio user in evaluating a mobile user's submitted replacement-dialogue items. The media server 60 and studio-module 70 could be components operating on a single device, such as multiple software modules running on a single computer.

Figure 3:
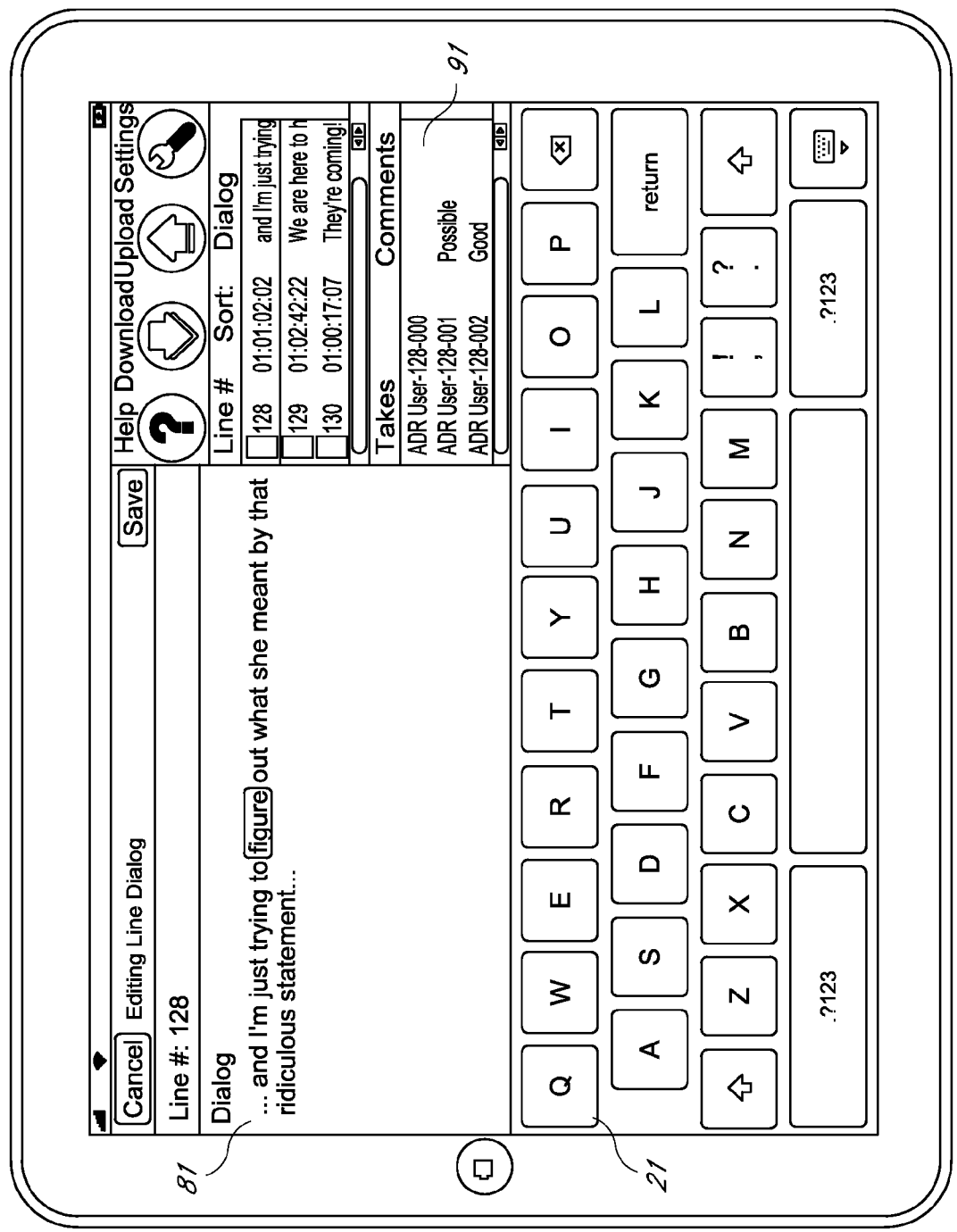
FIG. 3 is an image of a mobile replacement-dialogue recording device including mobile replacement-dialogue recording software in a state to allow editing of text guide media.
Figure 4:
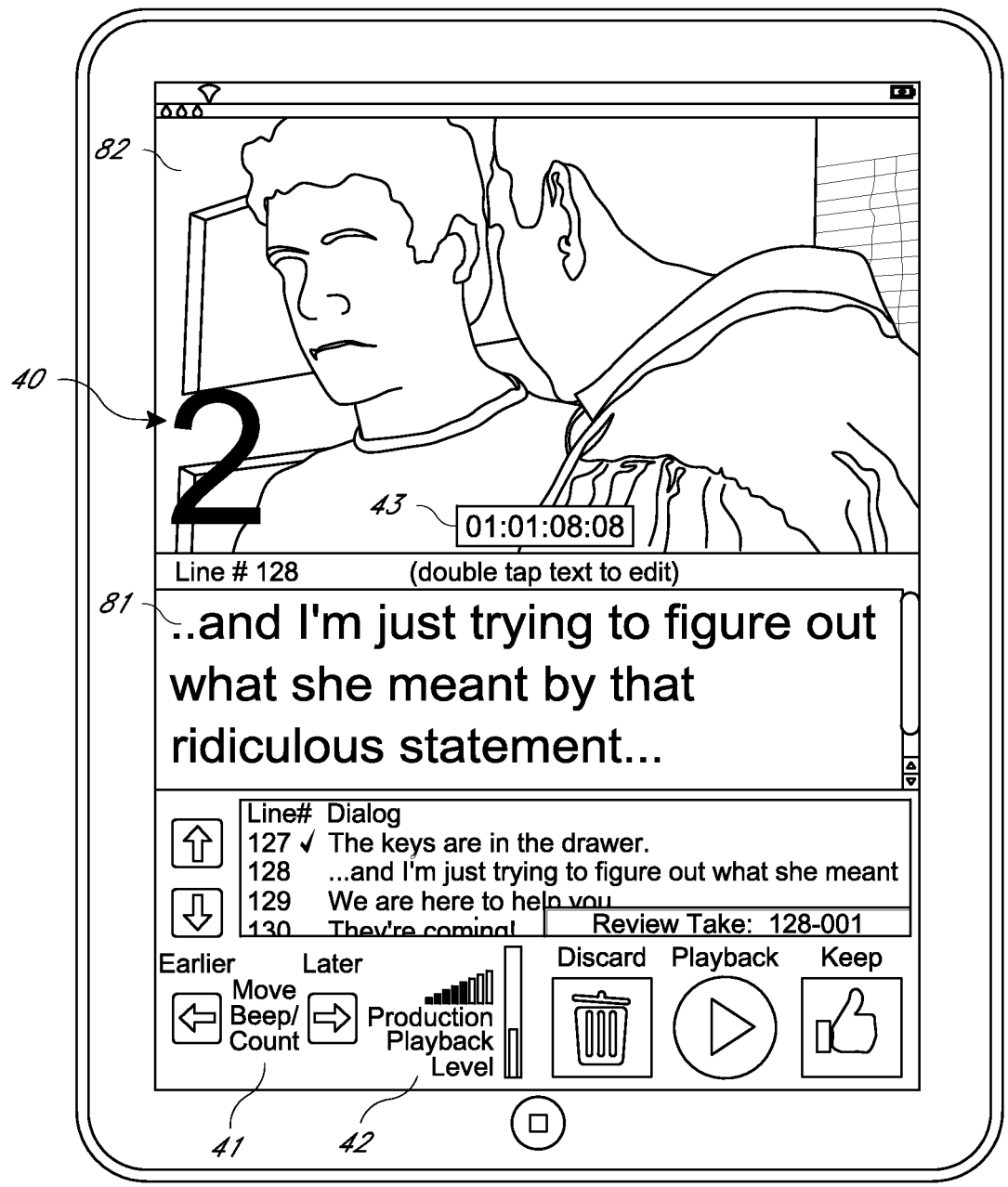
FIG. 4 is an image of a mobile replacement-dialogue recording device in a play mode in which the mobile user can view guide media. A countdown timer configured to produce three introductory beep lasing two seconds is shown and hi-lighted dialog lines are shown.

In FIG. 1, the mobile replacement-dialogue recording device 20 includes a mobile computing device such as an Apple Inc.® iPad® ("iPad") and associated mobile replacement-dialogue recording software. FIGS. 3 and 4 provide additional details for this particular mobile computing device and one embodiment of the mobile replacement-dialogue recording software which can be installed on it. Other mobile computing devices, such as laptops, smartphones, and other tablet devices could be used. As will be appreciated by one of ordinary skill in the art, such a mobile computing device generally includes a central processing unit ("CPU") capable of executing software instructions, memory for storing software instructions and other data elements, non-volatile data storage such as flash memory-based storage, magnetic-based storage or some other hard drive storage, and various data buses. In the illustrated example, the mobile replacement-dialogue recording software is an application installed onto the mobile-computing device. In other embodiments, the mobile replacement-dialogue recording software is a web-based applet or similar code which can be run on the mobile computing device without being installed. The mobile replacement-dialogue recording software's user interface could differ substantially from the graphical user interface shown in the figures. The graphical user interface illustrated in the figures is designed for a mobile computing device, such as the iPad, with a touch-sensitive display screen and the ability to display information in either portrait or landscape layout modes. Other mobile replacement-dialogue recording software may be designed for mobile computing devices with different input methods and form factors.

Such a mobile computing device may also include additional hardware elements including a visual display units such as a liquid crystal display ("LCD"), organic light-emitting diode ("OLED"), or active-matrix light-emitting diode ("AMOLED"), communications radios such as any IEEE 802.11x ("Wi-Fi"), International Mobile Telecommunications-2000 cellular data ("IMT-2000"), CDMA, GSP (collectively "3G cellular"), LTE Advanced or WiMAX cellular data ("4G") and Bluetooth, human-input devices such as a touch-sensitive display screen, touchpad, mouse, keyboard, pointing stick, stylus, or trackball, a microphone, a camera, speakers, indicator lights, and connection ports such as audio input, audio output, Universal Serial Bus ("USB") ports, an Apple® dock connector, or FireWire.

In some mobile computing devices, certain of these additional hardware elements are internal to the mobile computing device, while others may be connected to and located externally to it. The use of a high-quality microphone connected to the mobile computing device may allow for the recording of higher quality replacement-dialogue items. The use of headphones connected to the mobile computing device may allow for reduced audio feedback during the recording of replacement-dialogue items.

The mobile computing device may be connected to other devices in order to facilitate the recording of replacement-dialogue. For example, the mobile device may include video output capabilities which allow it to use an external display, such as a television, monitor, or projector, for video and other visual output. Speakers may also be used for some audio output.

In a specific embodiment, an iPad includes a touch-sensitive LCD display for visual output and mobile user input, a CPU, random access memory, flash non-volatile data storage memory, data buses, a 3G cellular data radio, a Wi-Fi radio, a Bluetooth radio, and an Apple® dock connector. The iPad may be used with an external, high-quality microphone, and headphones. Alternatively, the mobile replacement-dialogue recording device 20 could include some other mobile computing device. In still other embodiments, mobile replacement-dialogue recording is achieved at least in part through a web-based system accessible through an Internet Browser or other application. This allows the use of a general use personal computer or other device for mobile replacement-dialogue recording.

The mobile replacement-dialogue recording device 20 is capable of obtaining guide media. Guide media includes data items such as video data, audio data, text data, or other types of data. Guide media items are used as guides for the mobile user when recording potential replacement-dialogue items. When an actor is off set and needs to record replacement-dialogue, he may be sent guide media including video clips of the scenes in which his dialogue must be replaced. Those scenes are stored as video guide media items. The video files might contain audio data within them, or audio may be included as separate files. The guide media may also include text containing the script lines for which the actor is to record replacement dialogue.

For example, a mobile replacement-dialogue recording device 20 might obtain guide data including a video file in a video file format, such as AVI, MPEG, H.264, HTML 5, MOV, WMV, MP4, OGG, or MKV, an audio file in an audio file format, such as MP3, AIF, CAF, WAV, WMA, OGG, or MPEG-4, and a text file. One of ordinary skill in the art would appreciate that a variety of existing network protocols could be used by the mobile replacement-dialogue recording device 20 in order to obtain the guide media. The File Transfer Protocol ("FTP") is particularly suited for such uses. The Hypertext Transfer Protocol ("HTTP") could also be used. Any other communications protocol capable of transferring data between devices may be used for the purpose of transferring any data described here, including guide media, replacement dialogue media, or feedback media. Such transfer could take place using a variety of connectivity services, such as peer-to-peer, client-server, cloud-based communications, direct communications, or proxy-based communications. One example of the mobile replacement-dialogue recording device 20 includes an FTP-client as module of the mobile replacement-dialogue recording software. When the mobile user selects the "Download" button shown as the downward-facing arrow in FIG. 3, the FTP-client on the mobile computing device sends a request to an FTP-server application running on the media server 60. The FTP-server application replies according to the FTP protocol and provides a listing of guide media items available to the mobile user for download. The mobile user selects which guide media items he wishes to download by clicking associated check boxes in the mobile replacement-dialogue recording software's user interface. The FTP-client then downloads the data files for the selected guide media onto non-volatile storage of the mobile replacement-dialogue recording device 20. In embodiments in which the media server 60 is implemented using an alternative technology to the File Transfer Protocol, the media server 60, mobile replacement-dialogue recording device 20, and studio-module 70 are configured to be compatible with that alternate protocol.

Data, including guide media, replacement dialogue, and feedback media, may be transmitted to and from the mobile replacement-dialogue recording device 20 using any of a number of transmission protocols, including wireless protocols. In one embodiment, the mobile replacement-dialogue recording device 20 uses an 802.11 standard for transmission. In another embodiment, cellular data transmissions such as UMTS, GSM, CDMA2000, 3GPP LTE or WiMAX standards are used.

The mobile user may receive the mobile replacement-dialogue recording device 20 already configured with settings directing its FTP-client to an FTP-server at a specified in order to obtain guide media. The mobile user may also be able to alter or supply this information. The FTP-client requests the guide media files from the FTP-server and downloads them to local storage on the mobile computing device. In another embodiment, the mobile-computing device obtains the guide media in a substantially real-time manner so that it does not need to be stored on the mobile computing device's non-volatile storage—and is instead streamed to the mobile user. In other embodiments, the upload process may begin automatically without explicit user input, or the specific guide media items downloaded by the mobile computing device are determined without user selection.

A mobile user may be presented with the option to download only certain guide media items from the media server 60. Which items a particular user is allowed to download may be determined by a login username and password pair, or some other user-authentication method.

Once guide media items have been downloaded to the mobile replacement-dialogue recording device 20, the mobile user can prepare to record replacement-dialogue. For example, a guide media video file contains the recorded video corresponding to the portion of the recorded scene for which the mobile user will record a replacement-dialogue item. The guide media audio file corresponds to the recorded audio of that portion. The mobile user uses the mobile replacement-dialogue recording device 20 to record replacement-dialogue items which can be used to replace a portion of the existing audio track. In another example, audio and video are contained in a single guide media file. Guide data items, such as the above-described video data and audio data are often recorded days or weeks prior to the mobile user downloading them. However, in an embodiment where guide media is streamed to the mobile replacement-dialogue recording device 20 in substantially real-time, that guide media might correspond to a live-broadcast rather than having been previously recorded. In one embodiment, the mobile replacement-dialogue recording device 20 provides the mobile user with the ability to view the guide media in full-screen mode, so that a video guide media item is shown on the entire screen of the mobile replacement-dialogue recording device 20. In another embodiment, the mobile replacement-dialogue recording device 20 includes the ability to output video and audio signals to external display devices, such as televisions, computer monitors, and speakers, so that guide media can be viewed on those external display devices. Any other media item capable of being displayed by the mobile replacement-dialogue recording device 20, such as feedback media and potential replacement-dialogue items can be similarly displayed in full-screen mode or on external display devices.

Guide media obtained by the mobile user may also include a text file. For example, the guide media may contain a text file including the script 81 which the mobile user is to read when recording the replacement-dialogue item. The mobile user may be allowed to modify text file, such as by editing the script using the mobile replacement-dialogue device 21. It will be understood by one of ordinary skill in the art that a text file is meant to refer to a digital data object which conveys textual information to the mobile user, and that such files may vary in formatting and encoding.

In one embodiment, the guide media video file and guide media audio file are compact versions of the master video file and audio file which will be used in the final production. Because the guide media is used to guide the mobile user in recording replacement-dialogue items, it only needs to be of sufficient quality in order to accomplish that task. Accordingly, guide media video files or guide media audio files can be compressed or have their resolution, bit rate, frame rate, or number of audio channels reduced. This compression or reduction in resolution, bit rate, frame rate, or number of audio channels can be performed by the studio-module 70 as described below. The quality, size, and compression of guide media can be set independent of the quality, size, and compression of replacement-dialogue items and feedback media. Once the replacement-dialogue mobile device has obtained guide media, the mobile user is able to view that media.

The mobile user may view the obtained guide media in order to prepare for recording replacement-dialogue items. Actors often rehearse lines in synchronization with recorded video and audio in order to adjust their timing and delivery. The replacement-dialogue mobile device software includes video and audio playback functionality which allows the mobile user to easily rehearse. For example, this can be accomplished using a video playback interface including controls for Play, Pause, Stop, Rewind, Fast-Forward, Skip Forward, and Skip Back. Video playback and recording can also be controlled using a remote control device. The video playback interface may also include controls which are specifically targeted for this type of synchronized recording. For example, the playback interface may include a lead-in feature, such as a countdown timer which provides visual and/or audio cues designed to assist the mobile user in delivering dialog at the right time relative to the guide media playback.

Audiences are often very sensitive in noticing audio dialogue which is out of synchronization with corresponding, displayed lip movement. Actors recording replacement-dialogue for which such lip movement may be displayed must be particularly careful with both the pace of their dialogue delivery and the time at which it begins. The lead-in countdown timer can count down a configured amount of time using visual cues, audio cues, or both in order to help with such synchronization. The lead-in countdown timer could count down a five second lead in, composed of five one-second time intervals, by displaying a visual countdown timer in combination with audio beeps at the second intervals during the countdown. The visual countdown timer 40 could display the remaining seconds showing the remaining seconds and optionally milliseconds on some portion of the mobile computing device's display element. The audio cues may be configured so that the audio beeps are omitted for a specified last number time intervals. Other cue intervals may be provided, which are preset within the software or are user-configurable. For example, a countdown of "3, 2, 1" may be provided, with those numbers appearing in sequence on the mobile device's display, and corresponding audio beeps being produced.

Visual indicators may be included or be components of the mobile replacement-dialogue recording device 20 in order to provide additional user feedback signals. For example, an indicator light on the device could indicate when the device is in record mode. This or other lights could flash during a lead in period.

The mobile replacement-dialogue recording device 20 may contain other lead-in features, which may be configured by the mobile user. Different mobile users may have differing preferences as to when to begin delivering dialogue relative to the end of a lead-in countdown timer. Accordingly, the lead-in countdown timer may be adjusted so that the guide media begins playing once the timer reaches a specified point, such as the "1 mark" in a countdown from 5 to 1. Alternately, the guide media could begin playing once the timer reaches the "0 mark", or at some specified period of time before or after that mark. The user may be provided with functionality in order to move the beep or count time earlier or later 42.

Actors often find it helpful to have their dialog lines in front of them while they rehearse and record dialog takes. The mobile replacement-dialogue recording device 20 can display text guide media in order to guide the mobile user in creating potential replacement-dialogue. As shown in FIG. 4, dialogue text can be presented as part of the graphical user interface. Dialogue text 81 is read by the mobile replacement-dialogue recording software from text guide media. In this example, the text is displayed with line number identifiers which indicate which line number from a script a given section of dialogue text corresponds to. The mobile replacement-dialogue recording software can assist the mobile user in focusing on his portions of the dialogue text.

The mobile user's next line of dialogue text to be read may be is hi-lighted, such as by a text or background color, in order to attract the mobile user's attention. As video 82 and audio guide media is played back to the mobile user, the displayed portions of text guide media containing the dialogue lines can be updated. In one embodiment, entire text lines scroll down once their end has been reached. In another embodiment, text is displayed in a sideways-scrolling fashion so that the user can see dialogue lines approaching when those dialogue lines are supposed to be read. Text can scroll horizontally, vertically, or both. Text lines could also be accompanied by a voice waveform providing a visual representation of upcoming audio so that the mobile user can adjust spoken loudness or other aspects of dialogue delivery. In a simpler embodiment, the user is presented with a text region containing all of the relevant text guide media and may adjust the software's focus within that text as desired. In FIG. 4, the dialog text is displayed within its own area of the graphical user interface. In another embodiment, the dialogue text appears elsewhere in the graphical user interface, such as being superimposed over the video guide media. This can be accomplished in a way similar to the superimposition of the lead-in countdown timer 40 which FIG. 4 shows superimposed over the displayed video. Similarly, it will be noticed that FIG. 4 superimposes a time readout 40 associated with the displayed guide data on top of the displayed video.

Once a mobile user is comfortable rehearsing his lines against the guide media playback feature, he will want to record takes. The mobile replacement-dialogue recording device 20 can be placed into a record state. In the record state, the mobile replacement-dialogue recording device 20 presents the user with an interface for starting and stopping recording sessions, which are synchronized against playback of guide media. This allows the mobile user to deliver the dialogue lines which he had previously practiced during playback, but now having his performance recorded by the mobile replacement-dialogue recording device 20.

The user will speak so that a microphone connected to, or embedded within the mobile replacement-dialogue recording device 20 can receive his speech. The use of an external microphone may be desirable to facilitate such recording, and in one embodiment the mobile replacement-dialogue recording device 20 includes both a mobile computing device and an external microphone capable of being connected to the mobile computing device. Similarly, headphone may be used so that the audio output from the mobile computing device can be heard by the mobile user, but will not be received by the microphone. This may improve the resulting potential replacement-dialogue's audio quality by avoiding undesirable audio feedback.

Background noise present in the mobile user's environment can affect the quality of recordings. The mobile replacement-dialogue recording device 20 can detect and provide useful information concerning such background noise. For example, the device can use its microphone in order to determine whether the ambient sound level is unacceptably high, and suggest that the mobile user move to a quieter location if too much noise is detected. The device can inform the user of detected background noise through a readout on the display which is updated continuously or periodically. Recording settings, such as a microphone's sensitivity, can be adjusted in response to detected background noise levels. The device can also employ noise-filtering or noise-cancelling technology, implemented as hardware, software, or some combination, in order to improve the quality of recordings.

In one embodiment, the mobile replacement-dialogue recording device 20 provides the user with the ability and/or prompting to perform a non-scripted, free form dialogue. Such dialogue does not need corresponding guide media. However, some guide media indicator could be provided, such as a special character, icon, or italicized instructions, which let the user know when the free form dialogue is to begin. Another indicator may be used to inform the user when the free form dialogue ends—or this may be conveyed by the renewed display of traditional guide media items such as text script lines. Audio cues, or the use of a light indicator, such as an LED, may be used for indicating the beginning and/or ending of such free form dialogue sections. The mobile user may be prompted to input feedback media, such as a text description of the free form dialogue. Such a prompt may occur after or before the free form dialogue has been performed. Speech recognition technology may also be used to produce such feedback media. The user may also provide such feedback media without prompting from the software. As with other feedback media, this free form feedback media may be subsequently transmitted to a media server 60.

The mobile replacement-dialogue recording device 20 presents the user with setting options concerning recording. For example, the user may be presented with controls to adjust the input volume level of the microphone. The user may also be presented with controls to adjust the playback volume of the audio guide media which plays during recording. For an embodiment in which the mobile replacement-dialogue recording device 20 is designed to record multiple mobile users for the same replacement-dialogue item, such as multiple actors sharing a scene, those multiple mobile users may have their own microphones and the mobile replacement-dialogue recording device 20 may present controls to adjust each microphone's input level, individually.

Although the mobile replacement-dialogue recording system has been discussed primarily in the context of producing dialogue to replace portions of a recording's audio element, the system can be similarly used to replace portions of a recording's video elements. Dialogue-replacement items may therefore contain video data formatted in any of a variety of formats, as discussed in the context of guide media. The mobile replacement-dialogue recording device 20 may therefore also create a video recording of the mobile user as a potential replacement-dialogue item. The mobile replacement-dialogue recording system could be used to allow a mobile user to provide video clips suitable for replacement without needing the assistance of a full filming crew. Examples of situations for which such a mobile recorded replacement video item may be suitable include scenes in which little background portion will be visible, for instance a scene focused closely on the actor's face, replacement-dialogue which will be used as a subcomponent of a final scene, such as a video montage and therefore will take less space and attract less attention than an independently displayed video scene. Some video projects intend to produce final video which has a look and feel of being produced on consumer-grade electronics, and accordingly replacement-dialogue recording during the production of such projects could be accomplished using a mobile replacement-dialogue recording system that includes an iPad with a high-definition web-camera attached. A laptop with a built-in web-camera may also be used.

Another valuable application for mobile replacement-dialogue recording is the production of replacement-dialogue which will be used as temporary, rather than final, portions of a project. For example, a project's director may wish to record replacement video and audio media in which she plays a particular character roll until a suitable actress has been located to provide the final performances used for that character. Similarly, the mobile replacement-dialogue recording system could be used during early stages of production, such as casting, with replacement-dialogue is being recorded in order to compare try-outs for actors unable to perform try-outs in person.

Collaborative interactions are supported by the mobile replacement-dialogue recording system. For example, the mobile replacement-dialogue recording device 20 can use its video camera in order to support video-conferencing. Such conferencing could be built into the mobile replacement-dialogue recording software. A director may wish to provide an actor with guidance concerning the actor's performance to be recorded as replacement dialogue. The director and actor could collaborate on the performance through teleconferencing. The two could discuss the guide media scene during the initial rehearsal playback period. During the recording, the actor's mobile replacement-dialogue recording device 20 could stream recorded data to the director in substantially real time so that the director can provide feedback concerning a particular performance. The director may also be able to remotely collaborate during the review period, by creating or modifying feedback media, in addition to teleconferencing with the actor.

The mobile replacement-dialogue recording device 20 stores the user's recorded performance as audio and/or text data objects, for example as files on the mobile computing device's non-volatile storage. In another embodiment, the mobile replacement-dialogue recording device 20 uses a buffered stream in order to upload recorded replacement-dialogue in substantially real-time. This may be used in combination with the streaming of guide media to the mobile replacement-dialogue device so that the entire replacement process is occurring in substantially real time.

Figure 5:
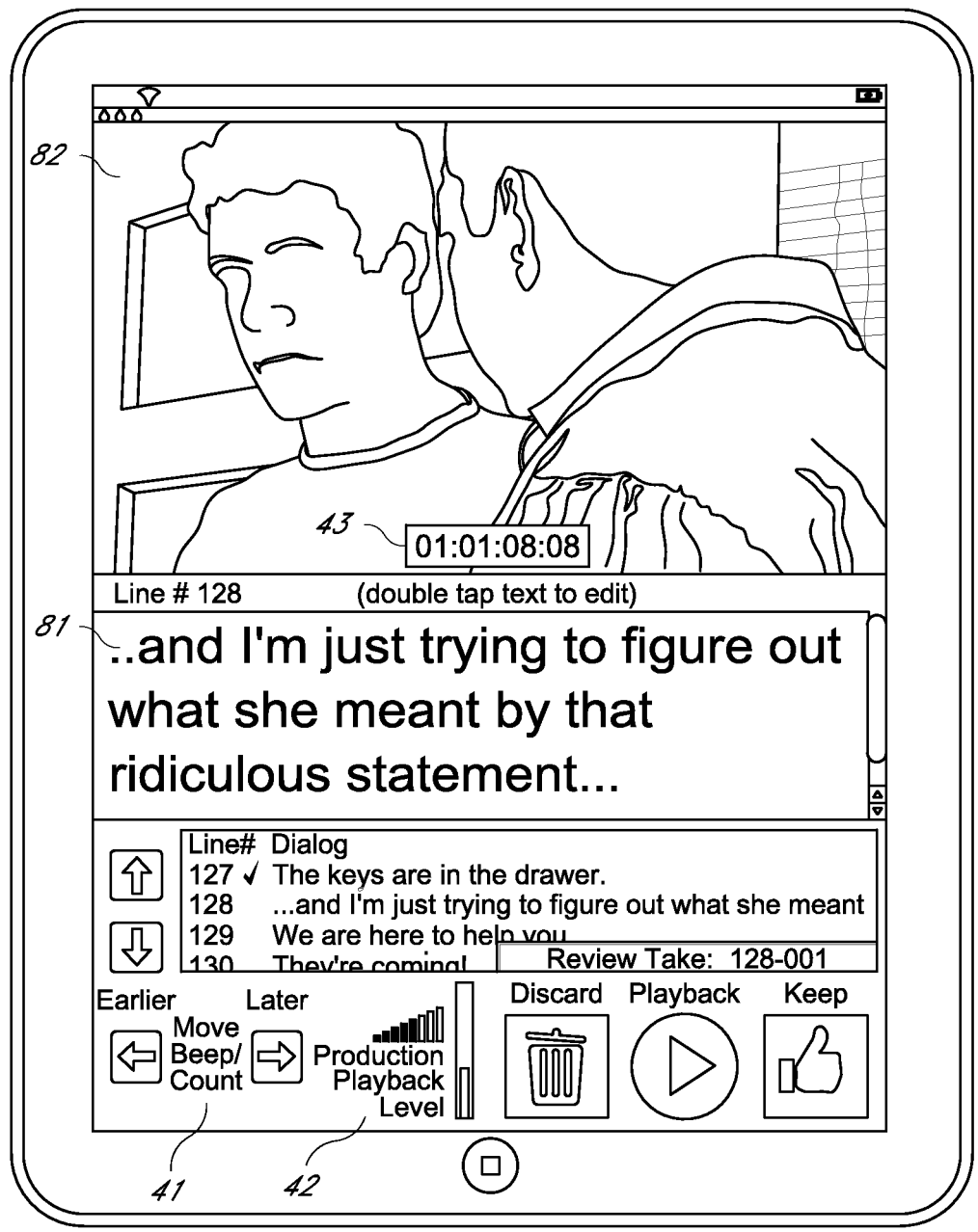
FIG. 5 is an image of a mobile replacement-dialogue recording device showing it in review mode so that the mobile user can review potential replacement-dialogue in synchronization with guide media. The user interface provides the mobile with ways to conveniently indicate whether he is satisfied with the potential replacement-dialogue item. The trash-bin button will delete the item, while the thumbs-up button will store it for possible uploading.

Once one or more potential replacement-dialogue items have been created, the mobile user may wish to review them. The mobile replacement-dialogue recording device 20 can be placed into a review state in which the mobile user can view his potential replacement-dialogue items and provide feedback media related to those items. FIG. 5 shows a mobile replacement-dialogue recording device 20 in a review state. The review state may closely resemble the playback state, because in both states media is being played to the mobile user.

The review state enables the user to provide feedback which can be stored as feedback media. Feedback media is associated with specific potential replacement-dialogue so that a studio-user who eventually views the feedback media can take the mobile user's feedback into account when evaluating the replacement-dialogue which the feedback media is associated with. Feedback media can include text comments, or an indicator of preference or other rating, such as a score associated with the replacement-dialogue.

The mobile user may be presented with controls for the capture of audio and/or video feedback media, which would allow him to produce a verbal or visual commentary containing his thoughts on the particular replacement-dialogue item under review. For example, the mobile replacement-dialogue recording device 20 can use its recording functions, microphone, and video camera to record the mobile user commenting on a replacement-dialogue track. This feature could closely resemble the record mode used in creating potential replacement-dialogue. The mobile replacement-dialogue recording device 20 presents controls in the review state which enable the mobile user to specify potential replacement-dialogue tracks for deletion, and specify other potential replacement-dialogue tracks for uploading so that they can be used by the studio-module 70 in the replacement process. The review state can also include controls which allow for a simple transition back to the record state if the mobile user determines that he would like to record additional potential replacement-dialogue items.

When a mobile user identifies a potential replacement-dialogue track which he likes, he uses the mobile replacement-dialogue recording device 20 to designate that track as a selected replacement-dialogue track. For example, the user may select a check-box next to a file icon or name corresponding to the potential replacement-dialogue item. Or, while viewing a particular potential replacement-dialogue item, the user may click a button in the user interface which indicates his approval. Replacement-dialogue items which have been selected by the mobile user can then be uploaded from the mobile replacement-dialogue recording device 20 to the media server 60. Uploading can be initiated by a user action, such as pressing the Upload button in FIG. 3, shown as a blue, up-facing arrow. Uploading can also be initiated without any user action, and uploading can occur in real-time, in time-separated batch processes, or in any other manner suitable for communicating such data from a mobile device to a media server 60.

The mobile replacement-dialogue recording device 20 can provide upload functionality in ways similar to the described download functionality. For example, an FTP client running on the mobile computing device can be used to connect to an FTP server running on the media server 60. The mobile replacement-dialogue recording device 20 can then initiate the transfer of selected replacement-dialogue items to the media server 60. The mobile replacement-dialogue recording device 20 also uploads to the media server 60 various feedback media associated with the selected replacement-dialogue items. Although it will often be the case that a mobile replacement-dialogue recording device 20 will upload selected replacement dialogue and feedback media to the same media server 60 as it has downloaded guide media from, that need not always be the case.

Feedback media can be associated with replacement-dialogue in a variety of ways. In one embodiment, a common file naming scheme ensures that all feedback media related to a particular replacement-dialogue item is contained in files which have file names of a format. In another embodiment, the mobile replacement-dialogue recording device 20 is designed to create and use single data files which include both replacement-dialogue and feedback media elements. This could be accomplished, for example, by creating a container file data type which initially only includes a replacement-dialogue item after such an item has been recorded, but is updated with feedback media items as they are created. A file structure may also be used in which replacement-dialogue and feedback media items are separate files but contain links or references to each other in order to represent their association. Users may be allowed to configure the default naming scheme, or file structure as one of the many settings which the system provides.

The mobile replacement-dialogue recording system contains a number of configuration settings, including settings which may be presented in a dedicated settings user interface 50. Some settings may be configured by mobile users, while others may only be configurable by other users, such as administrative users. Users can adjust volume levels for lead-in audio cues, guide media, and microphone sound-in levels, including support for multiple microphones. Visual elements such as font sizes can be adjusted individually for items such a dialog windows, lists, guide text such as dialogue lines. Timing elements, such as the default lead-in time, or "cue time", used before a media item is played can be configured. Recording qualities, such as file type, sample rate, and bit rate can be set. Input sources, such as selecting amongst microphones and cameras can be set. Media-server identifying settings, including network address and login information can be set. The name of the character for which the user is to record replacement dialogue for may be set, as can data recording settings such as record sample rate, record bit depth, and microphone source. Beeps as audio cues, visual countdown numbers, and dialog display can may each be adjusted to either on or off.

Guide media may contain information identifying dialogue lines with certain characters represented in the guide media. The mobile replacement-dialogue recording system can depict such representations to the mobile user. For example, the mobile user may have already been assigned a character, with that information contained in a portion of the guide media. Alternately, the user may select or enter the character name. The mobile replacement-dialogue recording software hi-lights the text for only that character. The software can be configured to display only the text associated with the mobile user's character.

Any component of the mobile replacement-dialogue recording system can also provide users with assistance in the form of help information. Such help information can be context-sensitive. Components of the system also support remote assistance. For example, the mobile replacement-dialogue device can include software which enables a mobile user to grant control of the device's operations to a remote user. Such control can be accomplished over a network in order to allow the remote user to assist the mobile user with an encountered problem. Such control could also be used for other tasks, such as collaborative interactions, or allowing a remote user to review potential replacement dialogue items.

The studio-module 70 is able to interact with the media server 60 so that guide media accessible to the studio-module 70 can be made accessible to the mobile replacement-dialogue recording device 20, and so that replacement-dialogue and feedback media generated by the mobile replacement-dialogue recording device 20 can be accessed by the studio-module 70. For example, the studio-module 70 could be an application running on a desktop computer within a post-production film or video editing studio. The studio-module 70 could contain an FTP-client component, or interface with an existing FTP-client application, in order to upload files to and download files from the media server 60 running an FTP-server application.

A number of video-production and editing software products exist. Components of the mobile replacement-dialogue recording system may be designed to interface with such software in order to support users in the replacement-dialogue process. For example, the studio-module 70 may include a plug-in, script, application, or other software element which is configured to interface with existing Automatic Dialogue Replacement applications. A studio-user could click a button within an existing Automatic Dialogue Replacement application which invokes the studio-module 70. The studio-module 70 might request information from the studio-user, such as which mobile users the resulting guide media should be sent to or made available to, naming information for the resulting guide media, additional comments from the studio-user to the mobile-user, and the extent to which guide data should be compact. Any of this information could be automatically supplied by the studio-module 70 based on configuration settings so that the studio-user does not need to provide it.

The studio-module 70 may provide additional functionality to the studio user, such as playing back the selected replacement dialogue items. This playback may be done alongside the playback of related feedback media items. FIG. 1 shows one example of the data flow of video, audio, and text files amongst the studio-module 70, media server 60, and mobile replacement-dialogue recording device 20. In another example, the media server 60 is a component of the studio-module 70 such that the mobile replacement-dialogue recording device 20 is downloading directly from, and uploading directly to, the studio-module 70.

The mobile server can be configured to provide users with individual or group-based levels of access. For example, certain studio-users may be granted access to upload guide media items to only certain locations within the media server 60. Studio users may also be restricted to downloading replacement dialogue items and feedback media items from certain locations. The mobile server may restrict users' abilities to view files present in a specific location in addition to restricting abilities to modify, create, or access such files.

The mobile server can contain additional features such as initiating user-notifications based on condition events occurring. For example, a user, could be sent a message by email or other method notifying him that a file of potential interest has become available. The media server 60 could transmit data to a mobile replacement-dialogue recording device 20 in order to notify the mobile replacement-dialogue recording device 20 of a file's availability. This could initiate the transfer of a file from the media server 60 to the mobile replacement-dialogue recording device 20.

Any component in the mobile replacement-dialogue recording system can have its functionality restricted based, for example, on whether that component has a valid license. The mobile replacement-dialogue recording software installed on a mobile replacement-dialogue recording device 20 can be configured to check a licensing server every time the software is launched. In such embodiments, the software will obtain verification from the licensing server that the software has a valid license. If the software is unable to verify that it has a valid license, it may restrict the user's use, for example by preventing access to certain functionality, or only providing such access for a limited trial period.

The licensing server could also be used to enforce various payment structures used with the system. A mobile replacement-dialogue recording system or components of the system may be made available to customers by sale, lease, rental, or other agreements. In one example agreement, a customer pays to rent a mobile replacement-dialogue recording device 20 for a period of time. In another example, a mobile replacement-dialogue recording device 20 communicates with a licensing server in order to determining the licensing status of the device itself or the mobile replacement-dialogue recording software that it contains. The licensing server can record usage so that the customer can be billed based on use. Other transactions-based revenue models could be used in connection with the licensing server, or other components of the mobile replacement-dialogue recording system. For example, a production studio may choose to lease a mobile replacement-dialogue recording device 20 from a device-ownership group. The device-ownership group may provide the production studio with a studio-module 70 and instructions for the configuration of a media server 60. The production studio may then provide the leased mobile replacement-dialogue recording device 20 to an actor who uses the device in order to record replacement-dialogue. The mobile replacement-dialogue recording software on the mobile replacement-dialogue recording device 20 checks for licensing status with a licensing server controlled by the device-ownership group.

Referring now to the various figures, further description is provided while noting that such details only describe various embodiments, and do not limit the invention in any way.

Referring now to FIG. 1, a mobile device 20, media server 60, and studio-module 70 are shown. The studio module may be located at a post production facility, or may be running on a computing device at some other location. In the presented embodiment, Guide Media 80 is shown being transferred from the studio-module 70 to the media server 60, and from the media server 60 to the mobile device 20. Feedback Media and Replacement-Dialogue 90 are shown being transferred from the mobile device 20 to the media server 60, and from the media server 60 to the studio-module 70. Other types of media or data may also be transferred between or amongst components of the system. In certain embodiments, guide media 80, feedback media, and replacement media 90, can each include combinations of types of data, such as text data, audio data, video data, or other data. Such data may be included in one or more files in a variety of file formats, and may be compressed.

Figure 2:
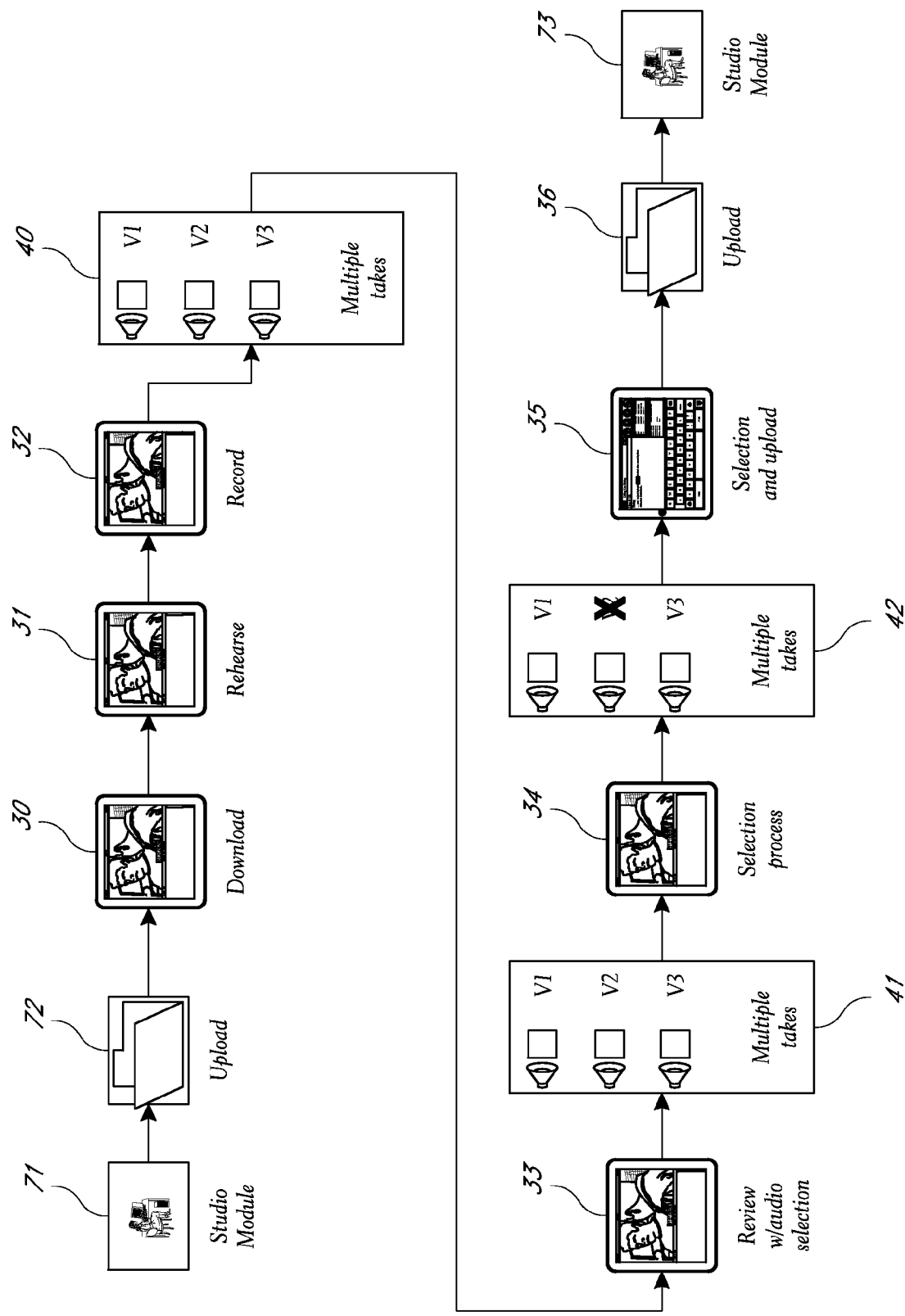
FIG. 2 is a workflow diagram for mobile replacement-dialogue recording using the system of FIG. 1.

Referring now to FIG. 2, a workflow for one method embodiment is shown. Studio-module 71 generates guide media which it uploads 72 to a media server. A mobile device 30 downloads that guide media and provides a user with the ability to rehearse 31 a replacement dialog, such as by listening to and viewing the guide media in combination with audio cues and replacement dialogue text for script lines to be read. The mobile device then records 32 the user's dialog performances, creating multiple takes 40. The user can review 33 these multiple takes, using a selected take's audio component while viewing video data from the guide media. The user may be presented with the ability to create notes concerning the various takes, resulting in annotated takes 41. The user may be presented with the ability to further select amongst the multiple takes, such as by providing ratings or other feedback, and designating individual items as specifically selected, or designating individual items as being specifically discarded. Discarded items may be deleted from the mobile device. The mobile device then performs a selection and upload process 35, so that it may upload selected items to a media server 36. A studio module 73 may later obtain those items, including replacement dialog and feedback media, from the media server.

Referring now to FIG. 3, a user interface of one embodiment is shown. The user is presented with a touch-sensitive on-screen keyboard 21 for use in editing dialog text 81. The user may also review and provide comment on lists of takes shown in a separate portion of the user interface 91.

Referring now to FIG. 4, a user is presented with a video scene 82 which he is to record replacement dialog for. The user's dialog performance is about to begin in two seconds, shown by the visual cue 40 superimposed over the video scene 82. The software also presents the user with the current time 43 of the playing scene. The user's next line 81 is shown, as is the line number identifying that line within the movie or television show's script. A separate interface portion below the individual line 81 shows the line in context of surrounding dialog, including dialog by characters other than the user's character. The interface provides the user with the ability to adjust the cue's beep and count lead ins, 41, and to adjust the volume level 42 of the production playback. User interface items are presented in order to allow the user to rehearse the performance, playback a previously recorded performance, and record a new performance such as recording in loop mode.

Referring now to FIG. 5, the user is being shown a playback interface which facilitates reviewing a previously recorded performance. The software presents the user with options to discard, playback, or keep the currently reviewed item. The user can adjust volume levels, such as production playback level 42, and his recorded audio replacement dialog. Such individual adjustments may allow the user to properly balance different audio levels.

Figure 6:
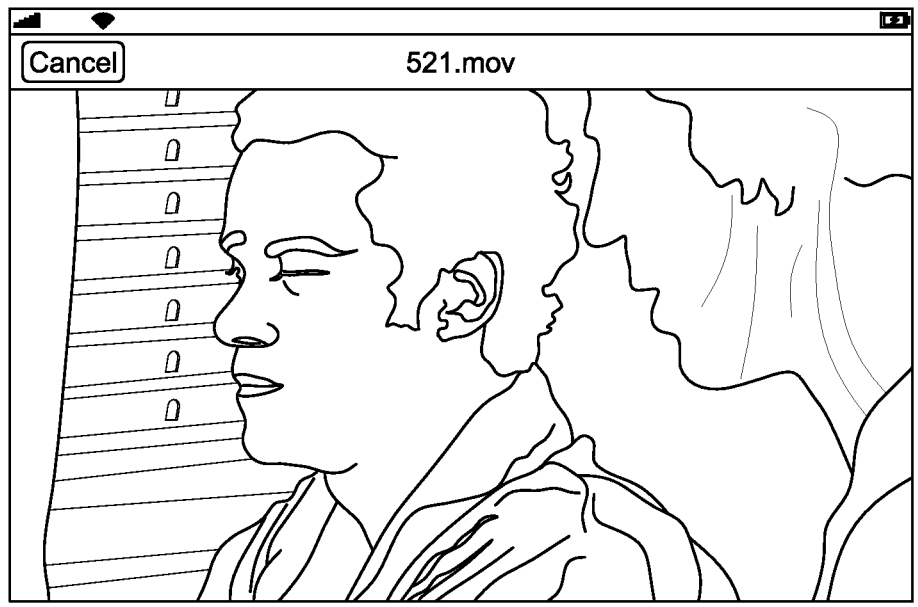
FIG. 6 is an image of mobile replacement-dialogue recording software in rehearse mode, displaying dialogue text data, feedback media text comments, loop record option, and other settings.
Figure 6:
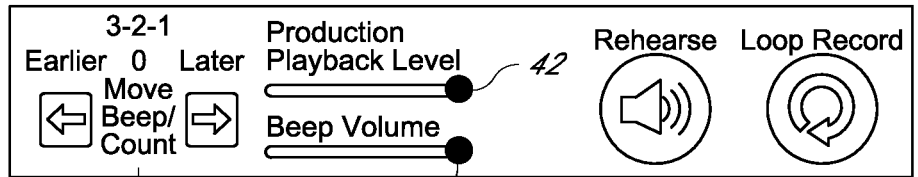

Referring now to FIG. 6, additional interface items are shown, including feedback media text comments describing individual takes which are represented by their corresponding files. The interface allows the user to quickly edit text by double tapping a text field to edit. Individual volume items, including production playback level 42 and beep volume 44 can be adjusted.

Figure 7:
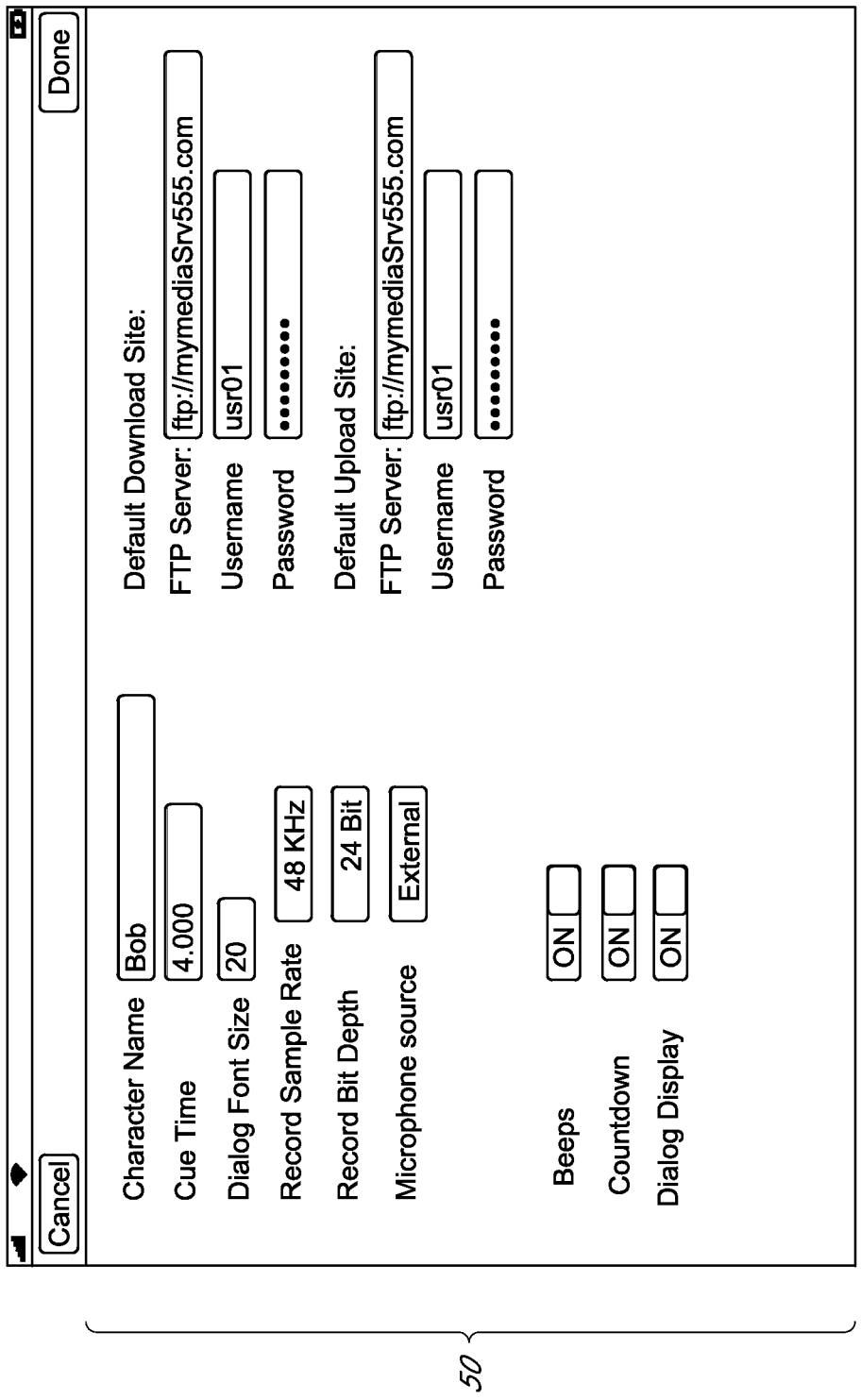
FIG. 7 is an image of mobile replacement-dialogue recording software in a settings configuration view.

Referring now to FIG. 7, an interface for adjusting settings is shown. The displayed settings can be edited by the user such as through text input, selecting items from drop down menus, or other user-input methods.

Referring now to FIG. 8, a list of recorded performances 51 is presented so that the user can select items for upload. A similar list may be presented to the user simply to review what items are currently on the mobile device, or what items are on some other device such as a media server.

Figure 9:
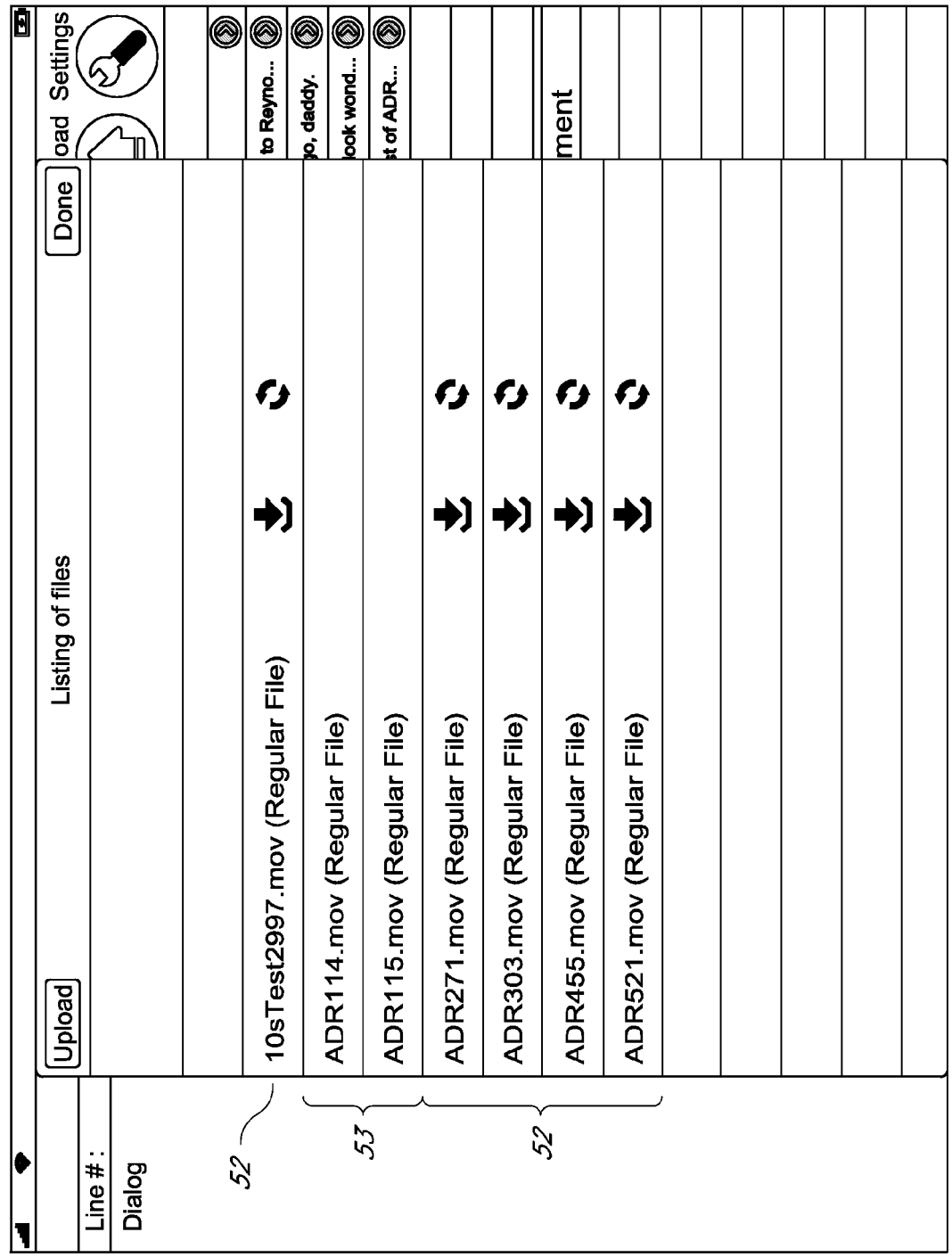
FIG. 9 is an image of mobile replacement-dialogue software displaying guide media items available for download.

Referring now to FIG. 9, an interface listing files is shown. The list displays what guide media is available on a media server. Certain guide media items have been downloaded to the mobile device already. The interface may present the user with the ability to resynchronize these files. Other guide media items have not been downloaded and the interface presents the user with the ability to download these.

Figure 10:
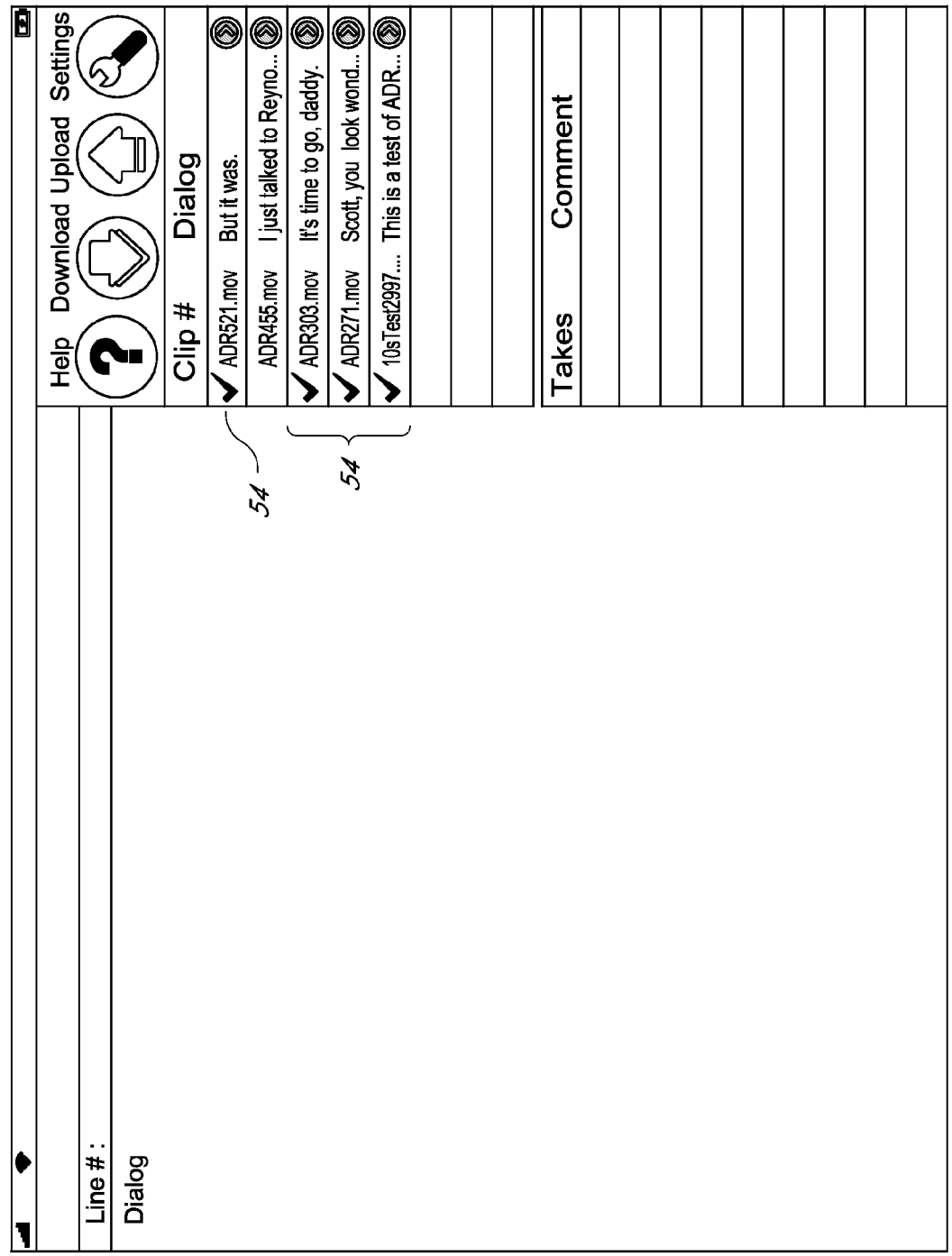
FIG. 10 is an image of mobile replacement-dialogue software displaying guide media when no guide media text is initially present.

Referring now to FIG. 10, an interface displaying information reflective of recorded replacement performances is shown. The replacement performances may be recorded audio and video to be used in the replacement post-production process. The software has recorded user selections for preferred recorded items, shown by checkmarks for certain files 54. Interface buttons are presented for the user to quickly review any of these items.

Figure 11A:
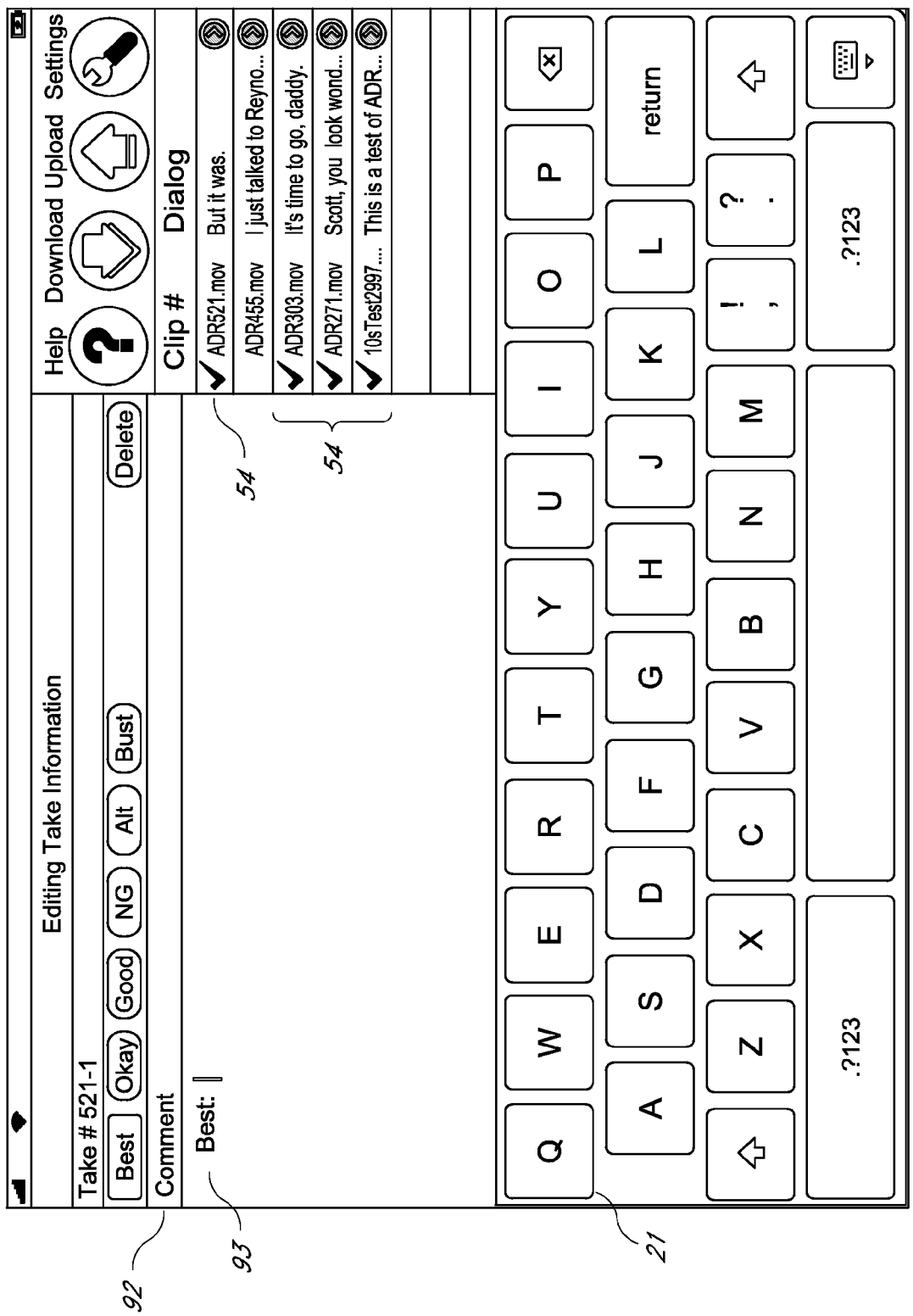
FIGS. 11a-b are images of mobile replacement-dialogue software displaying the feedback media editing feature for text editing of take information.

Referring now to FIG. 11A, a review-based interface is shown. The user is able to apply preset feedback tags such as "Okay," "Good," "NG" as shorthand for "Not Good," and "Alt" as shorthand for "Alternate". In other embodiments, other tags are presented, and tags may be arranged into multiple tag categories. The user is also presented with the ability to delete the recording, or add further text comments 93 to it using an on-screen touch sensitive keyboard 21.

Figure 11B:
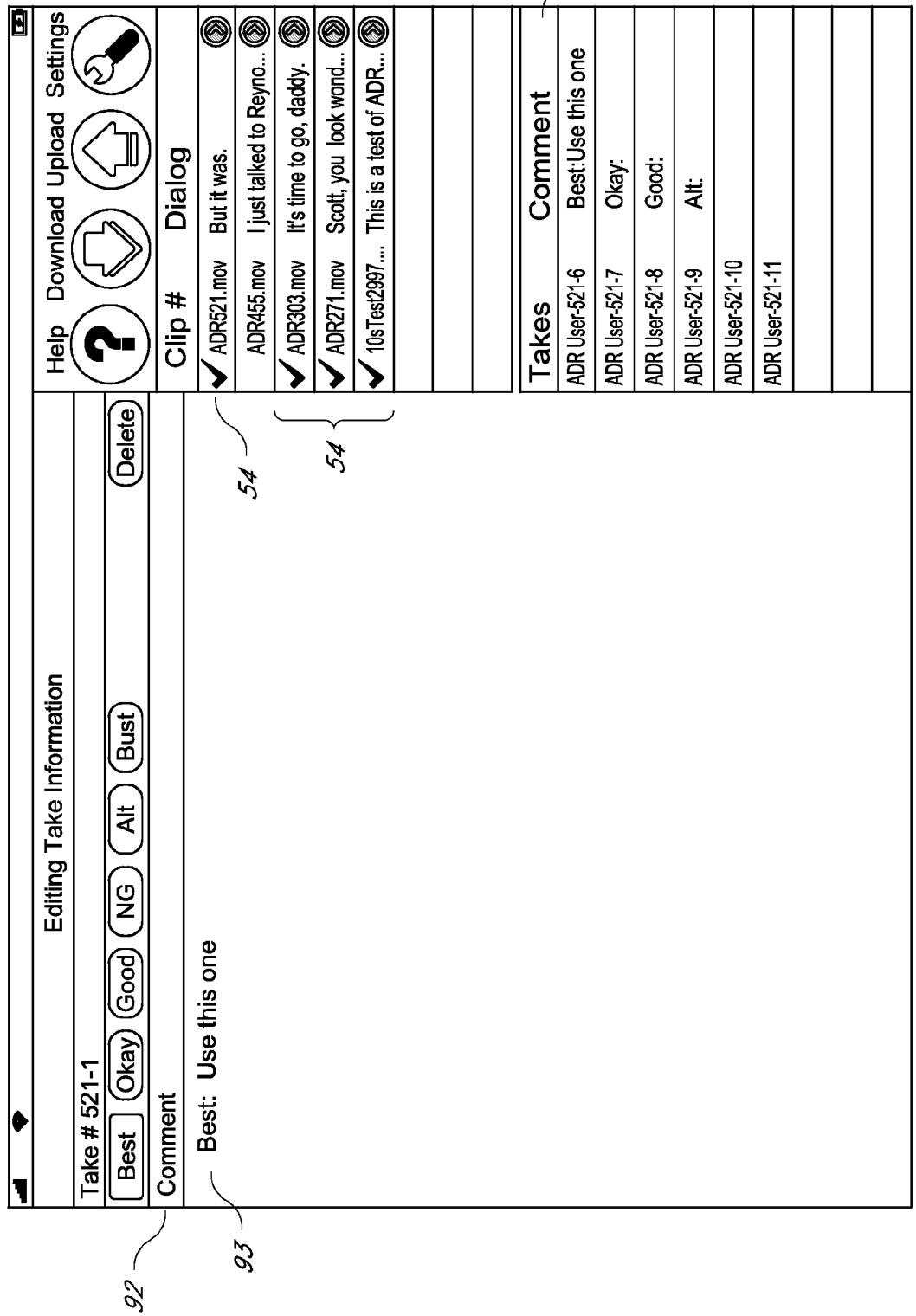

Referring now to FIG. 11B, an interface is shown following the user's text input of comments. Note that these comments are shown in the display section 91 containing comments for various recorded replacement performance files. These comments allow the use to include his thoughts concerning various takes and dialog line sections on to persons who may be interacting with a studio-module during video post-production editing, in which the final decisions as made as to which replacement items will be used.

It will be noticed that many of the figures include additional features of certain embodiments. For example, additional information may be included in the software's interface, such as the current time, the connection status of the mobile device, the network service to which the mobile device is connected, and the battery status of the mobile device.

In one embodiment, the system enables a user to create a replacement-dialogue remotely from a media recording studio, and comprises a media server configured to receive and make available guide media, wherein the guide media includes audio and video data representative of a dialogue for which a replacement-dialogue is to be created, and a mobile device programmed, with mobile replacement-dialogue recording software, to obtain the guide media from the media server, play the audio data included in guide media, play the video data included guide media, record the user's dialogue performance so as to create the replacement-dialogue, and transmit the replacement-dialogue to a receiving entity. The wherein mobile device may records the user's dialogue performance while also playing back the audio and video data included in the guide media.

In other embodiments, the system further comprising a studio-module configured to store and communicate the guide media. The mobile device may further provide an interface for creating feedback media which characterizes the replacement-dialogue, and that feedback media may comprise a text-based description of the replacement dialogue. The mobile device may further a touch-sensitive display unit capable of playing the video data included in the guide media and receiving user input from the mobile user.

The system may further comprise a licensing server for maintaining data representative of the licensing status of the mobile device or the mobile replacement-dialogue recording software, and communicating information concerning the licensing status to the mobile device. The audio or video data included in the guide media items may be a condensed representation of a higher quality recording of the dialogue for which replacement-dialogue is to be created for. That condensed status may comprise having a reduced resolution, bit rate, frame rate, or number of audio channels as compared to the higher quality recording.

In still other embodiments, the mobile device may further output audio or video cues prior to playing back the audio and video data so that the user's dialogue performance can begin at a time appropriate relative to the playback of the audio or video data included in the guide media. Alternatively, the mobile replacement-dialogue recording software may be further configured to classify replacement-dialogue as selected replacement-dialogue, and to transmit the potential replacement-dialogue after verifying that it has been classified as being selected replacement-dialogue. The receiving entity may be a media server.

In other embodiments, there is performed a method for creating a replacement-dialogue item using a mobile computing device, the method comprising receiving from a media server one or more guide media items including audio and video data representative of a dialogue for which replacement-dialogue is to be recorded, the one or more guide media items received by the mobile computing device over a wireless channel; playing the one or more guide media items on the mobile computing device so that a user can rehearse a dialogue performance; recording the mobile user's dialogue performance on the mobile computing device while also outputting the video data representative of a dialogue for which replacement-dialogue is to be recorded, in order to create a replacement-dialogue item; and transmitting the potential replacement-dialogue item over a wireless channel from the mobile computing device.

In some embodiments, transmitting may be done to a media server. In still other embodiments, the method comprises outputting audio or video cues prior to outputting the audio and video data representative of a dialogue for which replacement-dialogue is to be recorded, so that the mobile user's recorded dialogue performance can begin at a time appropriate relative to the playback of the audio or video data; providing the user with an interface for creating feedback media, wherein the feedback media characterizes the potential replacement-dialogue; and transmitting the feedback media to a receiving entity.

There exist other embodiments which are each a mobile replacement-dialogue recording device designed to enable a mobile user not located at a media recording studio to record replacement-dialogue, the mobile replacement-dialogue recording device comprising a processing unit capable of executing computer processing instructions, a memory unit capable of storing computer processing instructions, a display unit capable of outputting text and video data, a sound output unit capable of outputting audio data, and mobile replacement-dialogue recording instructions configured to obtain one or more guide media items including audio and video data representative of a dialogue for which replacement-dialogue is to be recorded for, play one of the guide media items so that the mobile user can rehearse a dialogue performance; record the mobile user's dialogue performance while also outputting the audio and video data representative of a dialogue for which replacement-dialogue is to be recorded; store data representative of the recording of the mobile user's dialogue performance as a potential replacement-dialogue item, and transmit the potential replacement-dialogue item to a receiving entity.

In some embodiments there is a non-transitory computer-readable medium having stored thereon an application that directs a mobile computing device to at least receive, over a wireless network, a digital representation of a video clip for which to record replacement dialog; play the digital representation of the video clip while recording replacement dialog of a user of the mobile computing device; and upload the recorded replacement dialog over the wireless network to a server for use in place of original dialog content of the video clip. In some such embodiments, the application includes a user interface that enables the user to control playback of the video clip via a touch sensitive display of the mobile computing device.

A handheld recording studio may be used which allows a nomadic actor to record replacement clips even when that nomadic actor is not located at a traditional recording studio. A handheld recording studio may operate on a laptop computer, tablet device, or other mobile processor and retrieve flawed performances so that the nomadic actor can provide improved performances. The handheld recording studio records the improved performances, records the nomadic actor's evaluations of those improved performances, and transmits both the improved performances and the evaluations. A performance data pool may be used, where multiple handheld recording studios transmit data items to and from the performance pool so that editors can gather those data items from the performance pool in order to prepare a final, improved media production. The final, improved media production could be a version of a movie, or a television episode.

Although the inventions have been described in terms of certain preferred embodiments, other embodiments will be apparent to those of ordinary skilled in the art, including embodiments that do not include all of the features and benefits set forth herein. Accordingly, the invention is defined only by the appended claims. For example, it will be understood that the use of the term "video" within the application does not limit the invention to from any type or format of motion-image content, including those stored on film mediums—"video" has been used as convenient shorthand for the broad concept of motion-image content. It will be understood that the term "user" has been used broadly and can include a user such as a mobile user or a studio user. It will be understood that any data which is described as being contained within an "item" could be contained in a number of distinct data files, or that data which is described as being contained in multiple items could be contained in a single data file. Any manner of software designs, architectures or programming languages can be used in order to implement embodiments of the invention. Components of the invention may be implemented in distributed, cloud-based, and/or web-based manners.

What is claimed is:

1. A system for enabling a media production team to incorporate user-generated replacement-dialogue recorded remotely from a media recording studio into a professional-quality media production based on user feedback data, the system comprising:
    a media server configured to receive and make available guide media, wherein said guide media includes audio and video data representative of a dialogue for which a plurality of replacement-dialogue files are to be created;
    a mobile device programmed, with mobile replacement-dialogue recording software, to (1) obtain said guide media from said media server, (2) receive user-input indicating a selection to play said guide media, (3) play a user-configurable lead-in queue, (4) upon completion of said lead-in queue, play said audio and video data included in guide media, (5) record a plurality of dialogue performances of the user so as to create a plurality of recordings of said replacement-dialogue, (6) delete selected dialogue performances in response to user input; (7) receive, for a plurality of the recorded dialog performances, user feedback input corresponding to the opinion of the user of the mobile device regarding the plurality of the recorded dialog performances, (8) generate user feedback data corresponding to the user feedback input, and (9) transmit said recordings of said replacement-dialogue and said user feedback data to a studio module; and
    wherein the studio module is configured to: (1) receive, from a plurality of mobile devices with mobile replacement-dialogue recording software, recordings of replacement dialogue and corresponding user feedback data, (2) provide at least some of said recordings of replacement dialogue and user feedback data to media post-production personnel, (3) receive selection data from the media post-production personnel based upon review of the user feedback data in determining which of said recordings to use in replacing dialogue in the professional-quality media production, and (4) replace dialogue in the professional-quality media production using the replacement dialogue based at least in part on the selection data;
    wherein said mobile device records said user's dialogue performance while also playing back said audio and video data included in said guide media.

2. The system of claim 1, wherein said user feedback data comprises a text-based description of said replacement dialogue.

3. The system of claim 1, wherein said mobile device further comprises a touch-sensitive display unit capable of playing said video data included in said guide media and receiving user input from said mobile user.

4. The system of claim 1, further comprising a licensing server for maintaining data representative of the licensing status of said mobile device or said mobile replacement-dialogue recording software, and communicating information concerning said licensing status to said mobile device.

5. The system of claim 1, wherein said audio or video data included in said guide media items is a condensed representation of a higher quality recording of said dialogue for which replacement-dialogue is to be created for.

6. The system of claim 5, wherein said audio or video data's condensed status comprises having a reduced resolution, bit rate, frame rate, or number of audio channels as compared to said higher quality recording.

7. The system of claim 1, wherein said mobile device further outputs audio or video cues prior to playing back said audio and video data so that said user's dialogue performance can begin at a time appropriate relative to the playback of said audio or video data included in said guide media.

8. The system of claim 1, wherein said mobile replacement-dialogue recording software is further configured to classify replacement-dialogue as selected replacement-dialogue, and transmit said potential replacement-dialogue after verifying that it has been classified as being selected replacement-dialogue.

9. A method for creating replacement-dialogue items using a mobile computing device and providing the replacement-dialogue items with accompanying feedback data for incorporation into a professional-quality media production based on the user feedback data, the method comprising:
   receiving from a media server one or more guide media items including audio and video data representative of a dialogue for which a plurality of replacement-dialogue takes are to be recorded, said one or more guide media items received by the mobile computing device over a wireless channel;
   receiving user-input indicating a selection to play said guide media items;
   ping a user-configurable lead-in queue;
   upon completion of said lead-in queue, playing said one or more guide media items on the mobile computing device so that a user can rehearse a dialogue performance;
   recording a plurality of said mobile user's dialogue performances on the mobile computing device while also outputting said video data representative of a dialogue for which replacement-dialogue is to be recorded, in order to create a plurality of replacement-dialogue item;
   deleting a dialogue performance in response to user input;
   receiving, for a plurality of the recorded dialog performances, user feedback input corresponding to the opinion of the user of the mobile device regarding the plurality of the recorded dialog performances;
   generating user feedback data corresponding to the user feedback input; and
   transmitting said plurality of replacement-dialogue items and said user feedback data over a wireless channel from the mobile computing device to a studio module, wherein the studio module is configured to receive, from a plurality of mobile devices with mobile replacement-dialogue recording software, recordings of replacement dialogue and corresponding user feedback data and provide at least some of said recordings of replacement dialogue and user feedback data to media post-production personnel so that said user feedback data can be considered in determining which of said recordings to use in replacing dialogue in the professional-quality media production.

10. The method of claim 9, further comprising:
   outputting audio or video cues prior to outputting said audio and video data representative of a dialogue for which replacement-dialogue is to be recorded, so that said mobile user's recorded dialogue performance can begin at a time appropriate relative to the playback of said audio or video data.

11. A mobile replacement-dialogue recording device designed to enable a mobile user not located at a media recording studio to record a plurality of replacement-dialogue items with accompanying feedback data for incorporation into a professional-quality media production based on the user feedback data, comprising:
   a processing unit capable of executing computer processing instructions;
   a memory unit capable of storing computer processing instructions;
   a display unit capable of outputting text and video data;
   a sound output unit capable of outputting audio data; and
   mobile replacement-dialogue recording instructions configured to:
      obtain one or more guide media items including audio and video data representative of a dialogue for which a plurality of replacement-dialogue items are to be recorded for;
      receive user-input indicating a selection to play said guide media items;
      play a user-configurable lead-in queue;
      upon completion of said lead-in queue, play one of said guide media items so that said mobile user can rehearse a dialogue performance;
      record a plurality of said mobile user's dialogue performances while also outputting said audio and video data representative of a dialogue for which replacement-dialogue is to be recorded;
      store data representative of said recordings of said mobile user's dialogue performance as a potential replacement-dialogue items;
      delete some of the data representative of said recordings of said mobile user's dialogue performances, based upon user input;
      receive, for a plurality of the potential replacement-dialogue items, user feedback input corresponding to the opinion of the user of the mobile device regarding the plurality of the potential replacement-dialogue items;
      generate user feedback data corresponding to the user feedback input;
      transmit said potential replacement-dialogue items and said user feedback data to a studio module, wherein the studio module is configured to receive, from a plurality of mobile devices with mobile replacement-dialogue recording software, recordings of replacement dialogue and corresponding user feedback data and provide at least some of said recordings of replacement dialogue and user feedback data to media post-production personnel so that said user feedback data can be considered in determining which of said recordings to use in replacing dialogue in the professional-quality media production.

12. A method for creating a professional-quality media production, the method comprising:
   recording an acting performance in a professional media studio;
   identifying a portion of the acting performance for which replacement dialogue is desired, after the performance in the professional media studio has been completed;
   making guide data available on a media server, the guide data including audio and video from the portion of the acting performance for which replacement dialogue is desired;
   providing an actor from the acting performance with a mobile device equipped to: (1) download the guide data from the media server; (2) receive user-input indicating selection to play said guide media items; (3) play a user-configurable lead-in queue; (4) upon completion of said lead-in queue, play the guide data in order to permit the actor to practice a replacement performance while viewing the guide data; (5) record multiple takes of the actor's performance of the replacement dialogue while playing the guide data to the actor; (6) receive feedback from the actor regarding the multiple recorded takes and store said feedback as user feedback data; and (7) upload the multiple recorded takes and the user feedback data to a media server;

receiving the multiple recorded takes and the user feedback data from the mobile device;

evaluating the multiple recorded takes based at least in part on the user feedback data;

selecting one of the recorded takes as the replacement dialogue for the identified portion of the acting performance;

replacing the identified portion of the acting performance with the selected recorded take in order to generate a professional-quality media production comprising the replacement dialogue; and providing the professional-quality media production with the replacement dialogue for use in the entertainment industry.

13. The method of claim 12, wherein said user feedback data comprises a text-based description of said recorded take.

14. The method of claim 12, wherein said feedback from the actor is received using a touch-screen interface.

15. The system of claim 1, wherein the user-configurable lead-in queue is a countdown timer configured to produce three introductory beep lasing two seconds.

16. The system of claim 1, wherein the user-configurable lead-in queue is a visual countdown timer providing the remaining seconds and milliseconds prior to the media being played.

17. The system of claim 1, wherein the system is configured to receive input from the user changing the number of lead-in beeps used in the user-configurable lead-in queue.

18. The method of claim 12, wherein the user-configurable lead-in queue is a countdown timer configured to produce three introductory beep lasing two seconds.

19. The method of claim 12, wherein the user-configurable lead-in queue is a visual countdown timer providing the remaining seconds and milliseconds prior to the media being played.

20. The method of claim 12, wherein the system is configured to receive input from the user changing the number of lead-in beeps used in the user-configurable lead-in queue.

\* \* \* \* \*

UNITED STATES PATENT AND TRADEMARK OFFICE
CERTIFICATE OF CORRECTION

| | | |
|---|---|---|
| PATENT NO. | : 8,802,957 B2 | Page 1 of 1 |
| APPLICATION NO. | : 12/875991 | |
| DATED | : August 12, 2014 | |
| INVENTOR(S) | : Sean C. Barker | |

It is certified that error appears in the above-identified patent and that said Letters Patent is hereby corrected as shown below:

On The Title Page

In column 2 (page 1, item 56) at line 16, Under Other Publications, change "Singal" to --Signal--.

In The Specification

In column 2 at line 55, Change "Device"" to --Device".--.

In The Claims

In column 19 at line 29, In Claim 12, change "ping" to --playing--.
In column 20 at line 64, In Claim 18, after "indicating" insert --a--.

Signed and Sealed this
Twenty-eighth Day of April, 2015

Michelle K. Lee
*Director of the United States Patent and Trademark Office*